United States Patent [19]

Spears

[11] Patent Number: 5,168,833
[45] Date of Patent: Dec. 8, 1992

[54] DOG GROOMING KIT APPARATUS

[76] Inventor: James W. Spears, 1136 Clark Tunnel Rd., Penryn, Calif. 95663

[21] Appl. No.: 835,365

[22] Filed: Feb. 14, 1992

[51] Int. Cl.⁵ ............................................. A01K 13/00
[52] U.S. Cl. ...................................... 119/85; 119/83; 132/112; 132/116; 206/581
[58] Field of Search ................ 119/83, 84, 85, 89, 119/156, 157; 132/112, 113, 114, 115, 219, 125, 148; 206/581

[56] References Cited

U.S. PATENT DOCUMENTS

| | | | |
|---|---|---|---|
| 463,942 | 11/1891 | Cole | 119/89 |
| 3,011,499 | 12/1961 | Tajan | 132/112 |
| 5,024,243 | 6/1991 | Snyder | 132/112 |
| 5,054,504 | 10/1991 | Winrow | 132/114 |
| 5,056,480 | 10/1991 | Murray, Sr. | 132/113 |

*Primary Examiner*—John G. Weiss
*Attorney, Agent, or Firm*—Leon Gilden

[57] ABSTRACT

A dog grooming kit includes a handle mounting in a replaceable manner a first head including a plurality of "U" shaped cleaner rods mounted to the head radially displaced relative to one another, with a second head arranged to define a fluid permeable generally cylindrical sheath, including a plurality of massaging combs mounted to an exterior surface of the sheath, and a combing head. The organization is arranged for selective use in combination with a conduit rod, including a matrix of apertures therethrough to permit selective fluid flow of various deodorizers and pesticides relative to a pet animal, such as a dog.

5 Claims, 4 Drawing Sheets

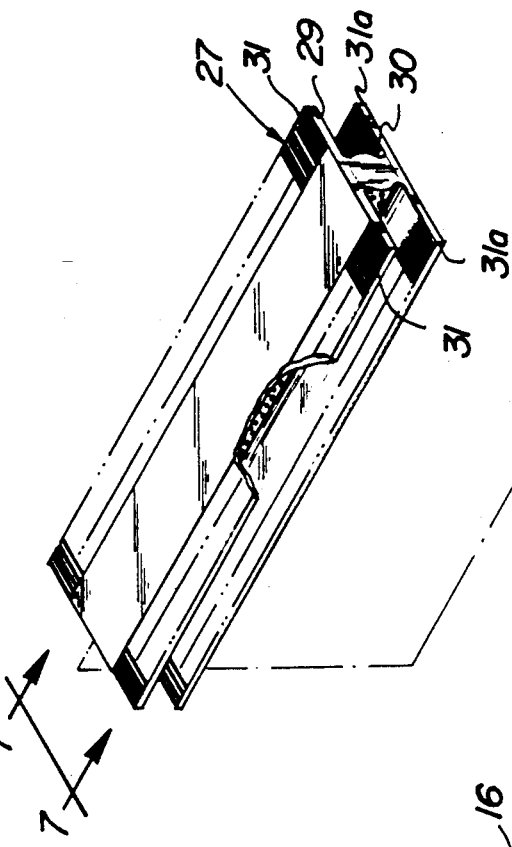
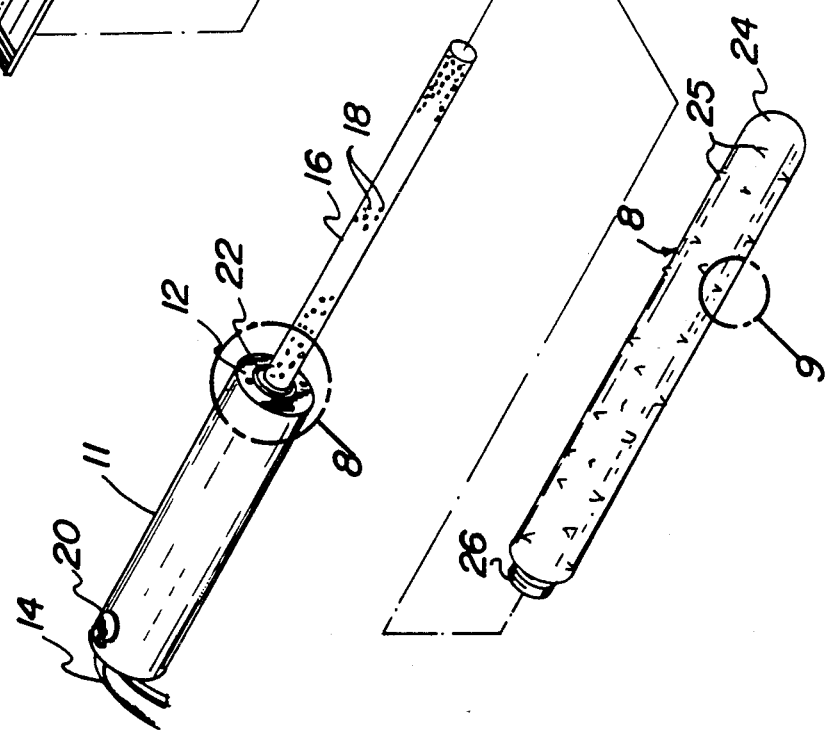
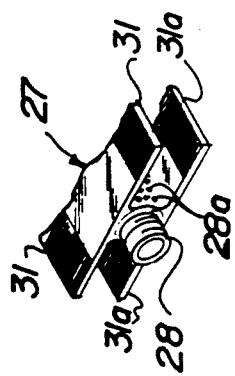

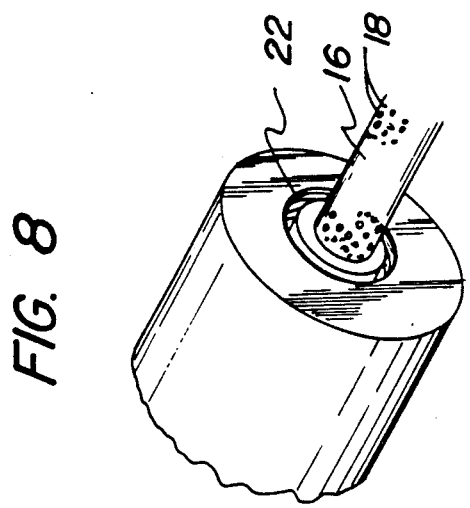
FIG. 8
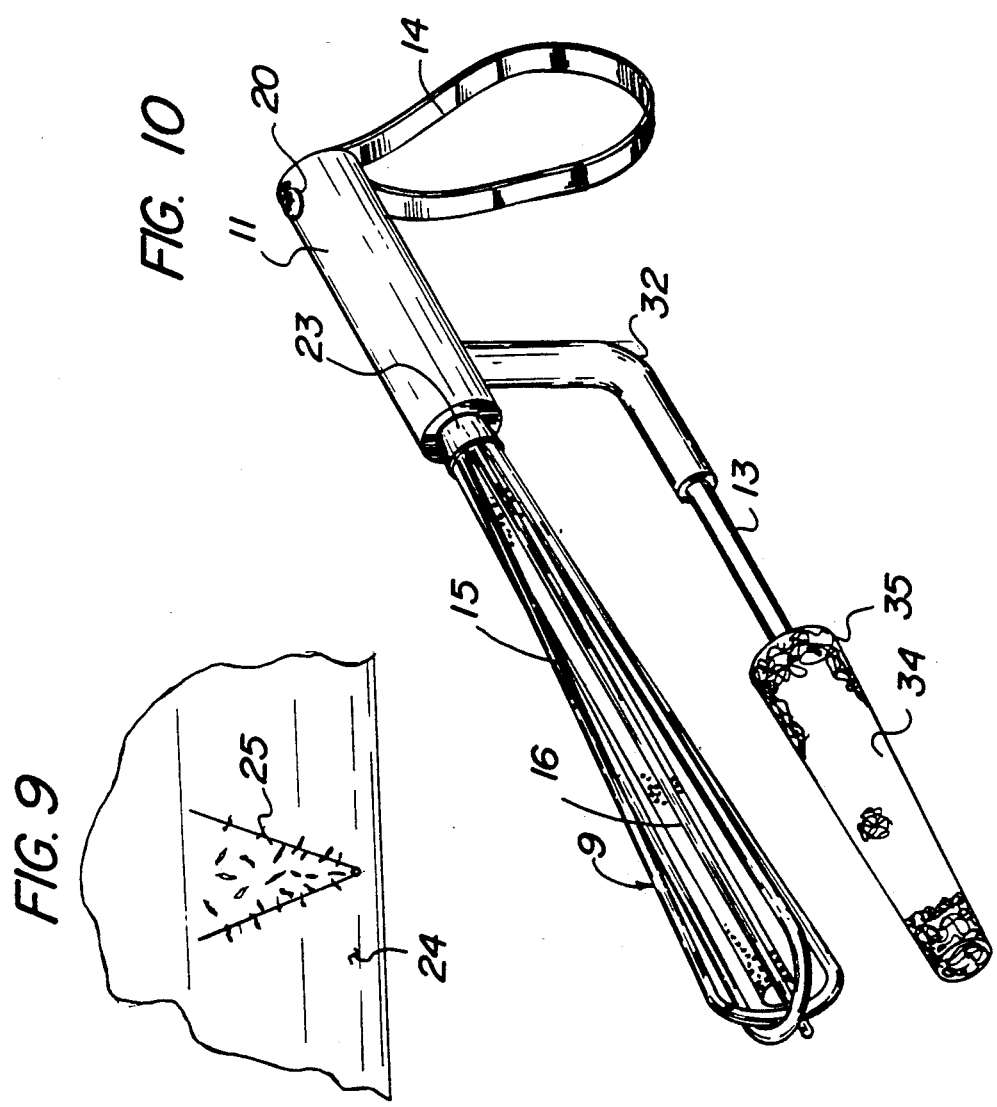
FIG. 9
FIG. 10

DOG GROOMING KIT APPARATUS

BACKGROUND OF THE INVENTION

1. Field of the Invention

The field of invention relates to grooming apparatus, and more particularly pertains to a new and improved dog grooming kit apparatus wherein the same is arranged for the convenient and efficient removal of hair relative to a dog and associated cleaning and grooming of the dog.

2. Description of the Prior Art

Grooming apparatus of various types has been utilized throughout the prior art to effect cleaning and grooming of animals. Such apparatus is exemplified in U.S. Pat. No. 4,947,799 to Parker utilizing a circular hoop curry comb arranged in association with a hot air blower.

U.S. Pat. No. 3,752,125 to Jackson sets forth an animal brush, including a flexible abrasive sheet for directing across an animal.

U.S. Pat. No. 4,936,259 to Owen, et al. sets forth a comb structure utilizing rotatable teeth, and U.S. Pat. No. 3,893,424 to Casler illustrating a comb utilized for removal of loose dog hair from an associated dog.

As such, it may be appreciated that there continues to be a need for a new and improved dog grooming kit apparatus as set forth by the instant invention which addresses both the problems of ease of use as well as effectiveness in construction to provide for a cleaning system for the efficient and effective removal of dog hair relative to an associated animal and the effective combing and currying of a dog subsequently thereto and in this respect, the present invention substantially fulfills this need.

SUMMARY OF THE INVENTION

In view of the foregoing disadvantages inherent in the known types of dog grooming apparatus now present in the prior art, the present invention provides a dog grooming kit apparatus wherein the same utilizes a handle mounting a plurality of dog removal wire loops relative to the handle for removal of excessive animal hair. As such, the general purpose of the present invention, which will be described subsequently in greater detail, is to provide a new and improved dog grooming kit apparatus which has all the advantages of the prior art dog grooming apparatus and none of the disadvantages.

To attain this, the present invention provides a dog grooming kit including a handle mounting in a replaceable manner a first head including a plurality of "U" shaped cleaner rods mounted to the head radially displaced relative to one another, with a second head arranged to define a fluid permable generally cylindrical sheath, including a plurality of massaging combs mounted to an exterior surface of the sheath, and a combing head. The organization is arranged for selective use in a combination with a conduit rod, including a matrix of apertures therethrough to permit selective fluid flow of various deodorizers and pesticides relative to a pet animal, such as a dog.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dog grooming kit apparatus which has all the advantages of the prior art dog grooming apparatus and none of the disadvantages.

It is another object of the present invention to provide a new and improved dog grooming kit apparatus which may be easily and efficiently manufactured and marketed.

It is a further object of the present invention to provide a new and improved dog grooming kit apparatus which is of a durable and reliable construction.

An even further object of the present invention is to provide a new and improved dog grooming kit apparatus which is susceptible of a low cost of manufacture with regard to both materials and labor, and which accordingly is then susceptible of low prices of sale to the consuming public, thereby making such dog grooming kit apparatus economically available to the buying public.

Still yet another object of the present invention is to provide a new and improved dog grooming kit apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of the kit construction utilizing a further plurality of heads utilized therewith.

FIG. 7 is an orthographic view, taken along the lines 7—7 of FIG. 6 in the direction indicated by the arrows.

FIG. 8 is an isometric illustration of section 8 as set forth in FIG. 6.

FIG. 9 is an orthographic view of section 9 as set forth in FIG. 6.

FIG. 10 is an isometric illustration of a further modified handle structure utilized by the invention.

DESCRIPTION OF THE PREFERRED EMBODIMENT

Figure 2:
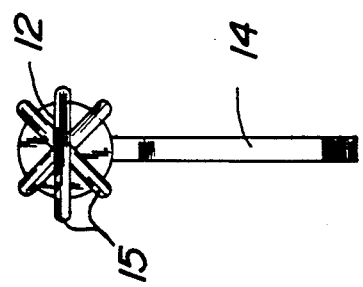
FIG. 2 is an orthographic front view of the invention as set forth in FIG. 1.
Figure 1:
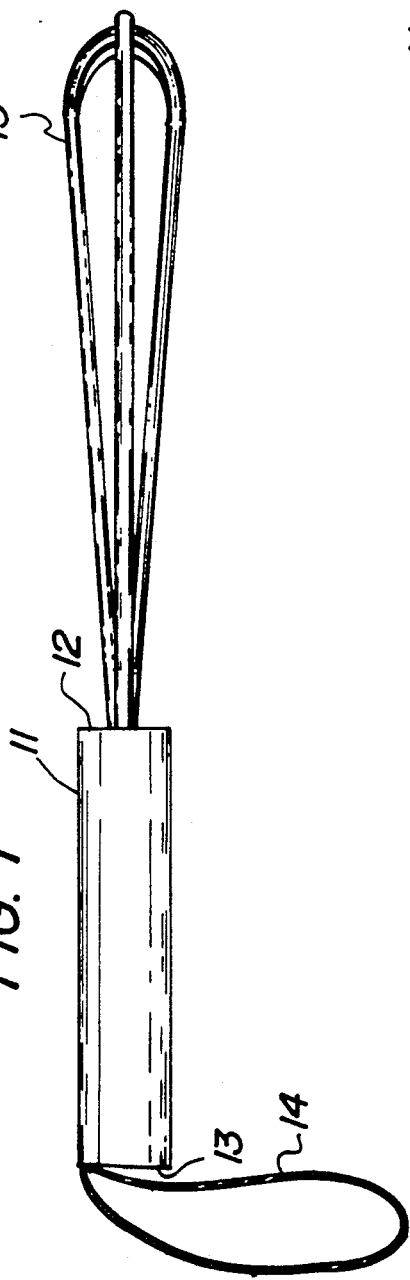
FIG. 1 is an isometric illustration of the invention employing a unitary handle mounting a head formed with a plurality of flexible dog removal loops thereto.
Figure 3:
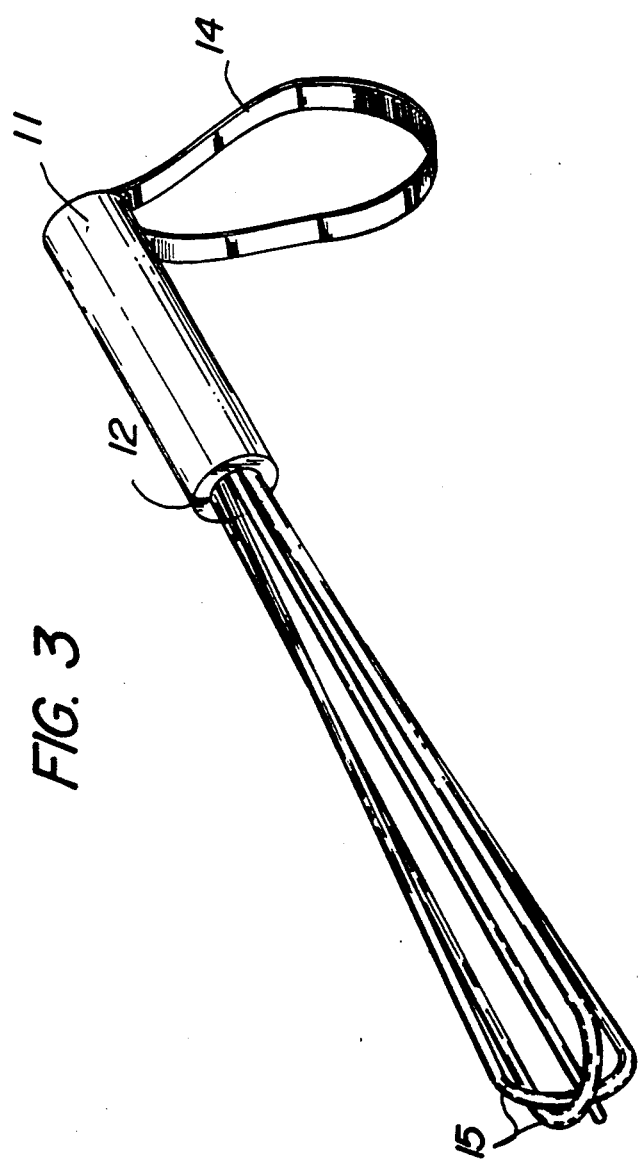
FIG. 3 is an isometric illustration of the invention as set forth in FIG. 1.
Figure 4:
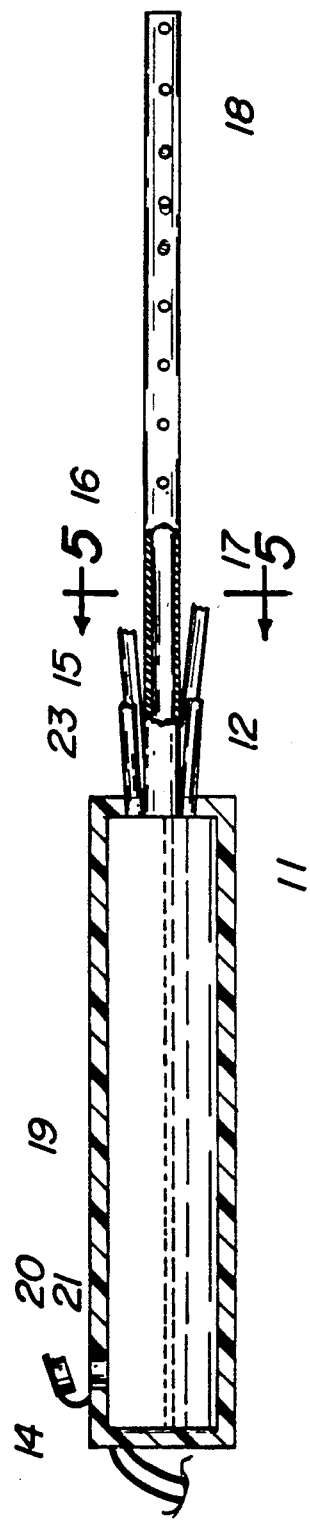
FIG. 4 is an orthographic side view, partially in section, of a modified handle and removal head structure utilized by the kit construction of the instant invention.
Figure 5:
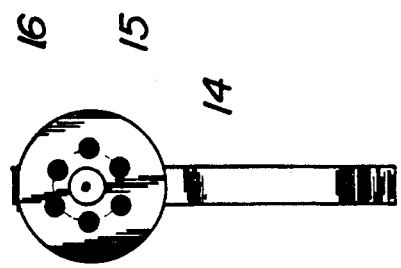
FIG. 5 is an orthographic view, taken along the lines 5—5 of FIG. 4 in the direction indicated by the arrows.

With reference now to the drawings, and in particular to FIGS. 1 to 10 thereof, a new and improved dog grooming kit apparatus embodying the principles and concepts of the present invention and generally designated by the reference numerals 11-35 will be described.

More specifically, the dog grooming kit apparatus of the instant invention essentially comprises a first model of the organization set forth to include a cylindrical handle 11 formed with a handle forward end wall 12 spaced from a handle rear end wall 13. The handle rear end wall 13 includes a flexible handle loop 14 mounted thereto for ease of manual grasping of the handle and its securement about an individual's wrist portion. A plurality of "U" shaped cleaning rods 15 of substantially equal length whose rear distal ends of each of the legs of the rods are fixedly mounted in a circumferential manner relative to one another to the handle forward end wall 12. The rods when directed about an animal assist in the removal of hair thereform minimizing abrasion and discomfort to the animal.

The FIGS. 4-10 illustrate the further use of the handle II formed with a handle cavity 19 to include a fill port 21 permitting selective filling of a fluid within the cavity 19 of such fluid such as perfumes, bactericides, germicides, pesticides, and the like. A fill plug 20 effects plugging of the port 21 subsequent to filling of the cavity 19. A central conduit rod 16 is mounted coaxially and orthogonally relative to the front wall 12 extending forwardly thereof, including a plurality of conduit rod ports 18 directed therethrough for the projection of the fluid through the ports 18 exteriorly thereof, wherein the conduit rod is positioned coaxially of the "U" shaped cleaning rods 15 that in turn are secured to a cleaning rod externally threaded support boss 23 threadedly received within a threaded socket 22 formed within the forward end wall 12 (see FIG. 8). A first head 9 therefore formed with the cleaning rod loops 15 mounted to the associated boss 23 is removably mounted relative to the forward end wall 12, wherein a second head 8 or a third head or combing head 27 may be utilized (see FIG. 6). The second head 8 includes a cylindrical massaging head 24 formed of a fluid impermeable material, with a massaging head threaded boss 26 arranged for securement into the threaded socket 22, with the second head arranged for reception of the central conduit rod 16 therewithin. The combing head 27 includes a combing head externally threaded boss 28 of a tubular construction receiving the central conduit rod 16 therethrough. A first combing flange 29 and a second combing flange 30 are arranged in a parallel diametrically opposed relationship relative to the combing head boss 28, with the first combing head 29 including a plurality of coextensive and parallel first flange combing teeth and the second combing flange 30 including second flange combing teeth 31a. The combing head boss 28 of cylindrical construction directed between the first and second combing flanges 29 and 30 includes a matrix of fluid directing boss ports 28a permitting directing of fluid therethrough from the conduit rod 16.

The FIG. 10 additionally to construction of the FIGS. 4-9 includes the use of a generally "L" shaped support leg 32 mounted to the handle to rotatably mount a support rod 33 in a rotatably parallel relationship relative to the handle and to the conduit rod 16. The support rod 33 includes a truncated conical adhesive roll 34 mounted at a forward distal end thereof positioned in a spaced parallel relationship relative to the conduit rod 16 to receive and secure dog hair debris about its surface.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A dog grooming kit apparatus, comprising,
   a handle, the handle including a handle forward end wall spaced from a handle rear end wall,
   and
   a first head removably mounted relative to the forward end wall and in coaxial relationship relative to the handle, wherein the first head includes a first head externally threaded support boss,
   and
   the handle forward end wall includes a threaded socket coaxially directed through the forward end wall receiving the first head externally threaded boss,
   and the first head externally threaded boss including a plurality of "U" shaped cleaning rods mounted to the first head support boss projecting forwardly and coaxially relative to the handle forward end wall, wherein the "U" shaped rods are axially rotated relative to one another about the first head support boss, and are each of a substantially predetermined length, and a central conduit rod fixedly mounted coaxially of the forward end wall within the threaded socket, and the central conduit rod extending forwardly a further predetermined length less than the predetermined length, and the central conduit rod including a plurality of conduit rod ports directed therethrough, and the central conduit rod in fluid communication with a handle cavity, the handle cavity including a fluid contained therewithin, and the handle including a fill port directed through the handle and the fill port including a fill port plug removably mounted relative to the fill port to permit selective refilling of the handle cavity.

2. An apparatus as set forth in claim 1 wherein the kit further includes a second head, the second head formed as a cylindrical massaging head of fluid impermeable material mounted to a massaging head threaded boss, the massaging head threaded boss selectively securable to the threaded socket upon removal of the first head from the threaded socket, and the massaging head further including a matrix of conical cones projecting exteriorly of the cylindrical massaging head to enhance massaging in use of the second head.

3. An apparatus as set forth in claim 2 wherein the kit further includes a third head, the third head including a combing head threaded boss cylindrically arranged to receive the central conduit rod therewithin, and including a lower externally threaded portion for selective securement to the threaded socket, and the combing head boss includes a first combing flange and a second combing flange mounted coextensively with the combing head boss diametrically opposed relative to one another and in a parallel relationship, wherein the first combing flange includes a plurality of coextensive and parallel row of first teeth, and the second combing flange includes a plurality of spaced parallel rows of second combing teeth.

4. An apparatus as set forth in claim 3 wherein the handle is arranged to further include an "L" shaped support leg, the "L" shaped support leg rotatably mounting a support rod, the support rod oriented parallel relative to the central conduit rod, and the support rod including a truncated conical adhesive roll mounted to a forward distal end of the support rod, wherein the adhesive roll is arranged in a parallel spaced relationship relative to the conduit rod.

5. An apparatus as set forth in claim 4 wherein the combing head boss includes a plurality of fluid directing boss ports directed therethough between the first combing flange and the second combing flange to direct fluid from the conduit rod through the fluid directing boss ports.

* * * * *